UNITED STATES PATENT OFFICE.

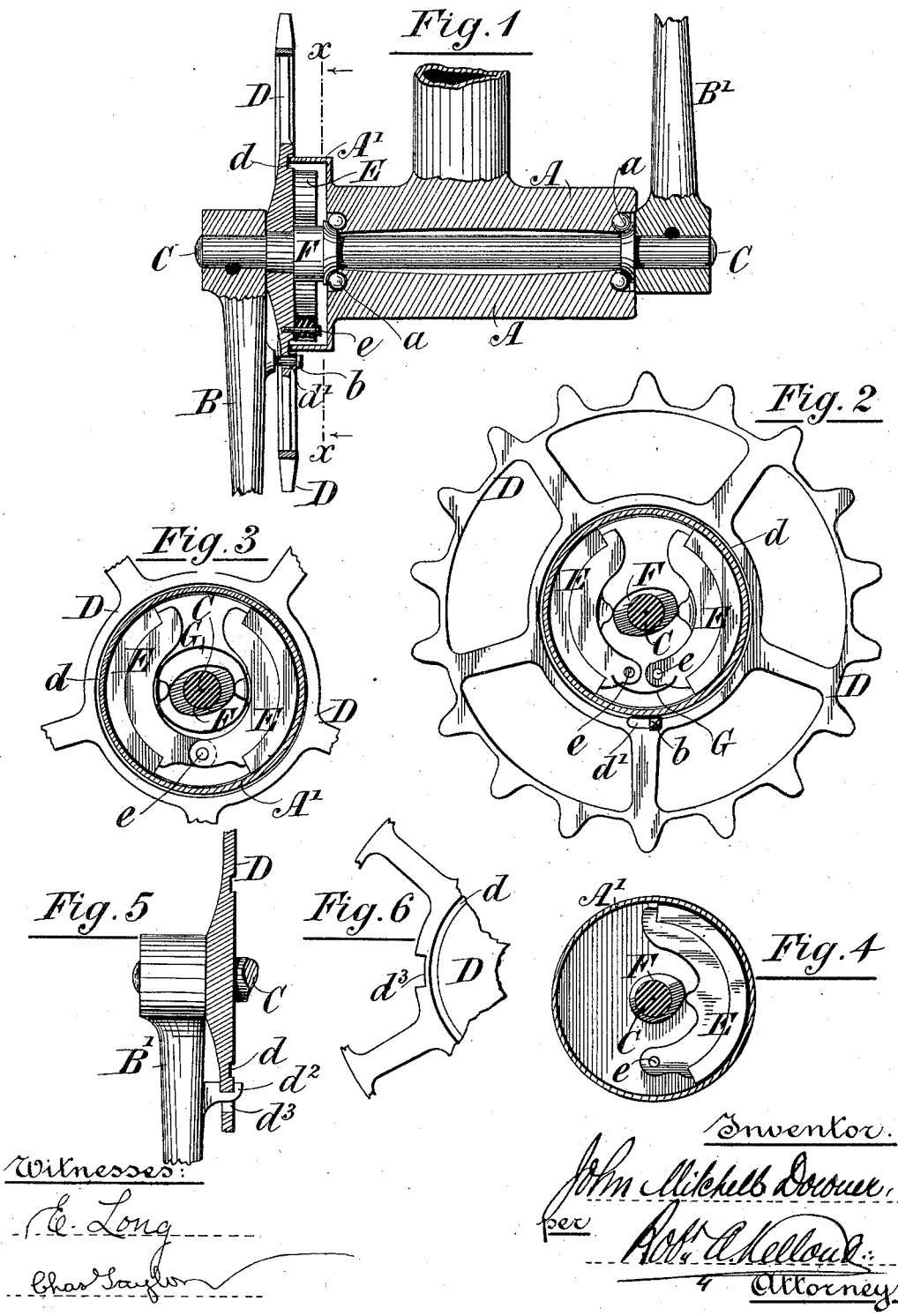

JOHN MITCHELL DOWNER, OF TORONTO, CANADA.

BICYCLE-BRAKE.

SPECIFICATION forming part of Letters Patent No. 606,334, dated June 28, 1898.

Application filed December 18, 1896. Serial No. 616,150. (No model.)

*To all whom it may concern:*

Be it known that I, JOHN MITCHELL DOWNER, a subject of the Queen of Great Britain, residing at the city of Toronto, in the county of York and Province of Ontario, Canada, have invented a certain new and useful Improvement in Bicycle-Brakes, of which the following is a specification.

This invention relates to bicycle-brakes of that class which are applied through the sprocket driving-wheel by the action of back-pedaling, and has for its object to produce a brake which shall be positive and direct in its action, easily applied, either instantaneously or gradually, and one which shall be simple and cheap in construction, not liable to get out of order, and one which will not add materially to the weight of the bicycle or interfere in any way with its easy running.

The essential features of my invention consist in a cam fixed upon the crank-axle and a brake-shoe pivotally connected to the sprocket and adapted to be thrown into frictional contact with a stationary part of the framing of the bicycle by the action of back-pedaling.

For full comprehension of the invention reference must be had to the accompanying drawings, forming part of this specification, in which similar letters of reference indicate like parts in the several figures.

In said drawings, Figure 1 represents a longitudinal sectional elevation showing a bicycle crank-axle in connection with the hub, sprocket, and pedal-cranks and illustrating the improved brake thereto applied. Fig. 2 is a vertical sectional elevation taken on the line $x\,x$, Fig. 1, looking toward the sprocket and showing the cam engaging two brake-shoes separately pivoted, the brake being shown in operation. Fig. 3 is a view taken on similar lines, but showing the two brake-shoes carried on the same pivot and a different form of returning-spring, the brake being also shown in operation. Fig. 4 represents another modification on the same line, showing the cam with only one brake-shoe and without a spring. Figs. 5 and 6 are details showing parts of one crank-arm and the sprocket and illustrating a modification of the means connecting same to insure their coöperation.

Referring first more particularly to Figs. 1 and 2, A represents the hub, formed in one with or connected to the tubing or framing of the bicycle and provided with any suitable antifriction devices $a\,a$ to insure easy running. B and B' are the pedal-cranks, and C the driving-axle, all of any approved construction. D is the sprocket, fixed upon said axle as usual and by preference having formed upon its inner face an annular groove $d$ to loosely receive the rim of a tubular extension A' of the hub or framing A. This tubular extension is preferably somewhat larger in diameter than the main body of the hub and serves to inclose and protect my improved brake mechanism, which, as hereinbefore premised, consists of one or more brake-shoes E, pivoted at $e$ to the inner face of the sprocket D, and a cam F for operating said brake-shoe or brake-shoes made in one with or firmly fixed upon the crank-axle C.

Connection between the crank B and the sprocket D is made by means of the pin $b$, fitting into said crank B and projecting through a curved slot $d'$, formed in the sprocket D, or this connection may be made in any other convenient way—such as by means of the finger $d^2$, projecting from the inner side of the crank-arm B and entering a depression $d^3$ in the web of the sprocket D, as shown in Figs. 5 and 6 of the drawings, or in any other convenient manner, the other conditions and arrangements being practically the same as hereinbefore described.

It must be understood that I reserve to myself various forms of arrangement of the brake-shoes E in connection with the sprocket D and tubular extension A'. For instance, the pivot $e$ may serve to support and connect two brake-shoes, as in Fig. 3, or one brake-shoe only, as in Fig. 4, or there may be two pivots, one carrying each brake-shoe, as in Fig. 2, or a pivot-point might project from one member into another, or there might be no special pivot between the brake-shoes and the contiguous surfaces, but reliance be had entirely upon the spring G (of which I have shown various modifications) to retain and return the parts to either position when the cam is either in or out of action, or any other modified arrangement upon the same principle might be adopted without departing from my improvement, and other variations of construction may be substituted without any essential change of structure or without departing from the essential principle of the improvement.

The operation of my improved bicycle-brake may be described as follows: When a steep downgrade may be encountered or when it is desired at any time to slow up or to quickly stop the forward movement of the bicycle, a slight back-pedaling motion is imparted to the pedal-cranks, (more especially to that crank marked B, immediately adjacent to the sprocket,) which retarding movement of the pedals and their axle has the effect of operating the cam F and bringing its longer surfaces or points into contact with the brake-shoe or brake-shoes E in such manner as to press same into frictional contact with the inner side of the rim of the tubular extension A' of the stationary hub or frame A, which frictional contact causes the gradual or immediate suspension of progress of the wheel according to the will of the rider.

What I claim, and desire to secure by Letters Patent, is—

1. In a bicycle-brake the combination with the crank-hanger and crank-axle, of the stationary sleeve or ring carried by the hanger, the sprocket-wheel having a limited movement on the crank-axle, a brake-shoe pivoted to the sprocket-wheel and adapted to bear against the inner face of the stationary sleeve, and the cam on the crank-axle adapted to operate the brake-shoe, substantially as described.

2. In combination with the crank-hanger and crank, the stationary sleeve carried by the hanger, the sprocket-wheel rotatably mounted upon the axle, a spring-pressed brake-shoe pivoted to the sprocket within the wheel, the cam on the axle adapted to contact with the brake-shoe, and the projection from the crank engaging an elongated slot or recess in the sprocket, substantially as described.

Toronto, 4th day of December, 1896.

JOHN MITCHELL DOWNER.

Witnesses:
  ROBT. A. KELLOND,
  E. LONG.